United States Patent [19]

Honbo et al.

[11] Patent Number: 4,733,296
[45] Date of Patent: Mar. 22, 1988

[54] MULTI-TUBE COLOR TV CAMERA IN WHICH LINEAR AND NON-LINEAR COMPONENTS OF A REGISTRATION ERROR DUE TO CHROMATIC ABERRATION OF A LENS ARE CORRECTED WITH CORRESPONDING DEFLECTION CORRECTION SIGNALS

[75] Inventors: Masanori Honbo, Mitaka; Kenji Takahashi, Kanagawa; Koji Kudo; Shusaku Nagahara, both of Hachioji, all of Japan

[73] Assignee: Hitachi Denshi Kabushiki Kaisha & Hitachi, Tokyo, Japan

[21] Appl. No.: 829,822

[22] Filed: Feb. 18, 1986

[30] Foreign Application Priority Data

Feb. 15, 1985 [JP] Japan .................................. 60-26267

[51] Int. Cl.$^4$ ...................... H04N 9/093; H04N 9/09
[52] U.S. Cl. .......................................... 358/51; 358/50
[58] Field of Search ..................... 358/50, 51

[56] References Cited

U.S. PATENT DOCUMENTS 3,872,499  3/1975  McConnell et al. .................. 358/51
4,472,740  9/1984  Doi ........................................ 358/51
4,549,117  10/1985  Takahashi et al. .................... 358/51

FOREIGN PATENT DOCUMENTS 3232920  3/1984  Fed. Rep. of Germany ........ 358/51
87237    8/1974  Japan .
2166     1/1982  Japan .
42286    3/1982  Japan .................................... 358/51
193193   11/1982 Japan .................................... 358/51
60887    4/1983  Japan .................................... 358/51
130686   8/1983  Japan .................................... 358/51
2126827  3/1984  United Kingdom ................. 358/51

Primary Examiner—James J. Groody
Assistant Examiner—Randall S. Svihla
Attorney, Agent, or Firm—Antonelli, Terry & Wands

[57] ABSTRACT

The chromatic aberration of the lens of a multi-tube color TV camera is separated into a linear component and a non-linear component. Horizontal and vertical deflection correction waveforms are generated in accordance with these two components. These two correction waveforms are superimposed onto horizontal and vertical deflection waveforms employed to deflect electron beams in said camera tubes. A registration error caused by the chromatic aberration of the lens is corrected with high accuracy by employing these correction waveforms.

6 Claims, 20 Drawing Figures

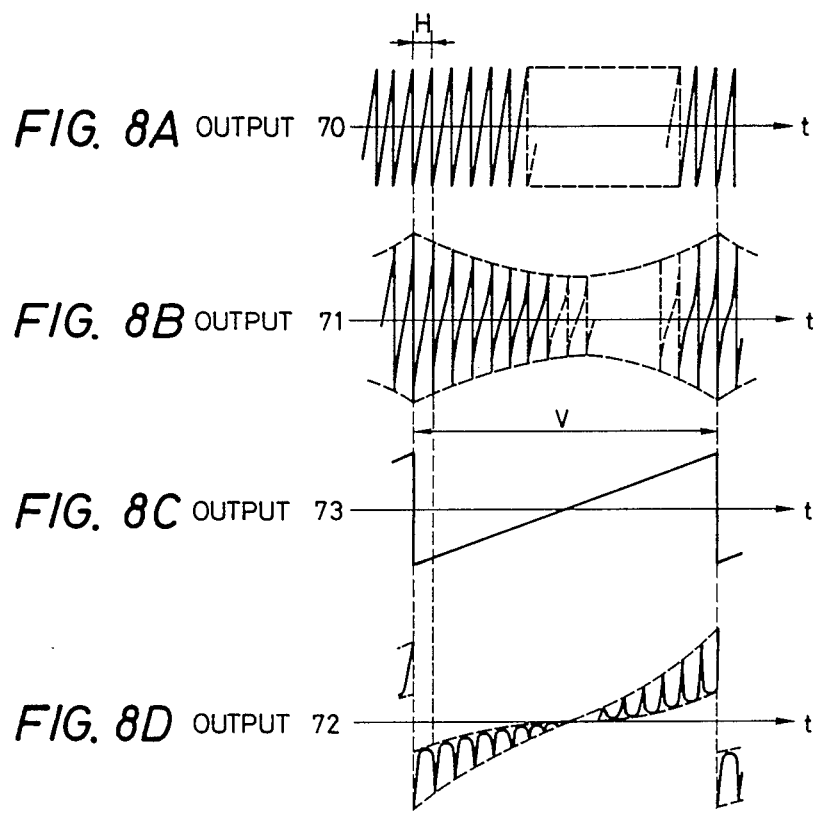

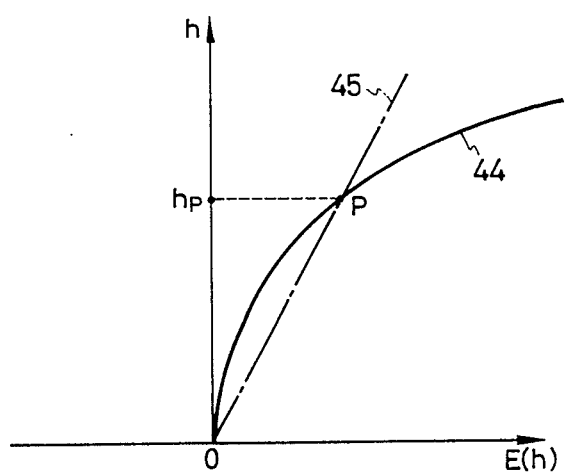
FIG. 9A
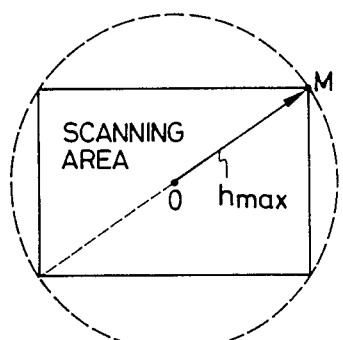
FIG. 9B
FIG. 10
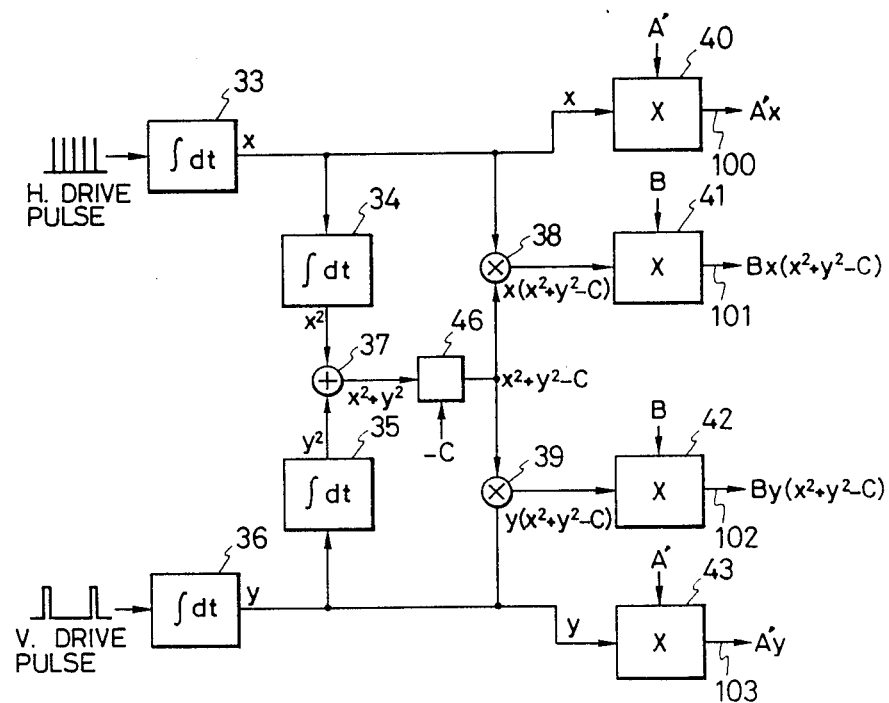

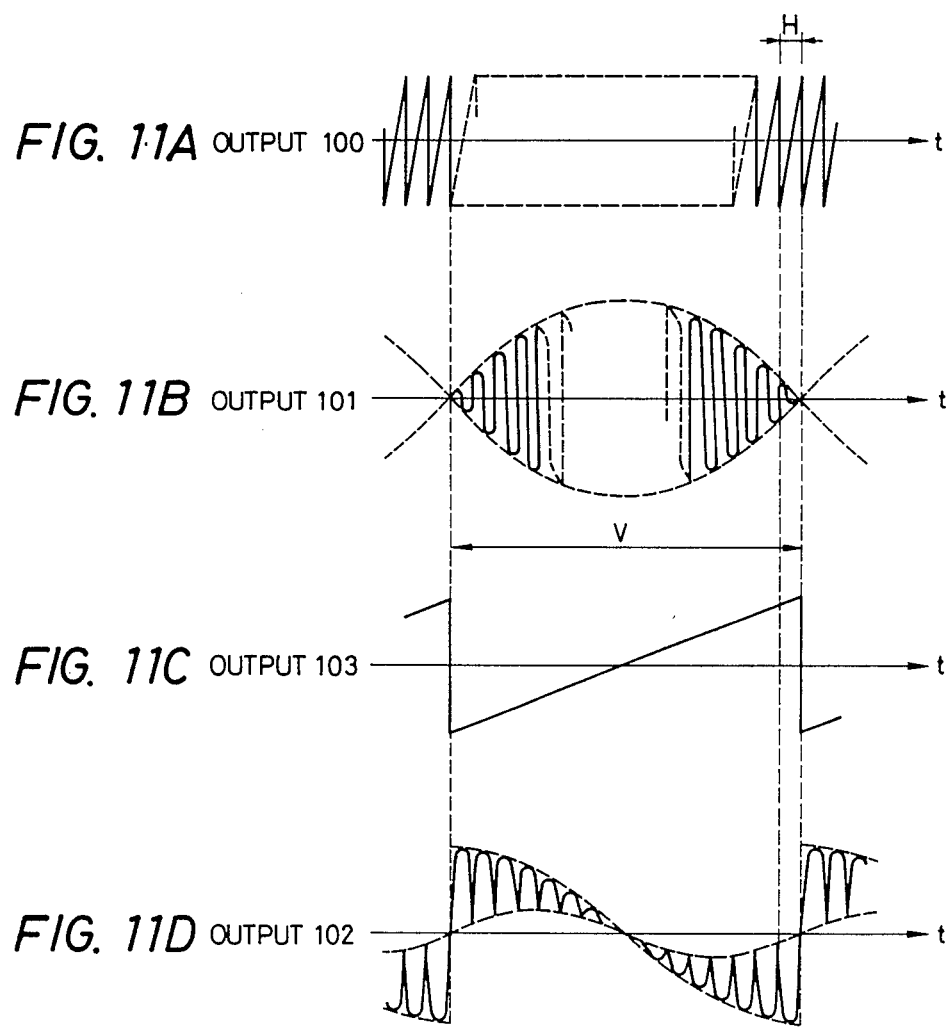

MULTI-TUBE COLOR TV CAMERA IN WHICH LINEAR AND NON-LINEAR COMPONENTS OF A REGISTRATION ERROR DUE TO CHROMATIC ABERRATION OF A LENS ARE CORRECTED WITH CORRESPONDING DEFLECTION CORRECTION SIGNALS

BACKGROUND OF THE INVENTION

The present invention relates to correction of registration errors caused by chromatic aberration in an optical device (zoom lens, dichroic prism) of a multi-tube type TV camera.

FIG. 1 shows the constitution of a three-tube type color TV camera.

As is shown in FIG. 1, in a three-tube type color TV camera, a subject 1 is picked up through a zoom lens 2, and the optical image obtained is separated into tri-color images of red (R), green (G) and blue (B) by a dichroic prism 3, which are then respectively converted into electrical signals by individual camera tubes 4r, 4g and 4b. The numerals 5r, 5g and 5b indicate deflecting coils respectively attached to the camera tubes, and numeral 6 indicates a deflection circuit for supplying deflection currents to the deflection coils 5r, 5g and 5b. The primary color signals thereby obtained are fed to the display equipment through signal processing circuit 7r, 7g and 7b. At the display equipment, these three primary color signals are added to each other so as to form a reproduced picture 8.

The process of adding primary signals from a camera is called registration. Registration deviations (registration errors) are caused by the following factors.

(1) chromatic aberration caused in an optical device such as a zoom lens and a dichroic prism, (2) variations in the geometric distortion characteristics of a camera tube and of a deflecting coil.

For the purpose of correcting a registration error caused by the second of these factors (2), one conventional method has been provided, in which a correction waveform such as a saw-tooth waveform and a parabolic waveform is added to a deflection waveform of the deflection circuit 6 shown in FIG. 1 so as to alter the position of an electron beam on the scanning area of the camera tube, thus correcting the error. Recently, another method known as the digital registration correcting method (disclosed in Japanese Patent Application Kokai No. 57-2166) has enabled highly accurate correction.

While registration errors caused by the first factor (1) mentioned above have been the subject of some studies, they have not been the object of correction in the method previously proposed or practiced, because this kind of distortion is one which changes dynamically while the other factors consist of static distortions.

Because of the recent progress made in the development of TV cameras such as the development of a high definition TV camera, the correction of registration errors caused by the problem (1) of chromatic aberration in optical devices has become a matter requiring urgent attention so that the overall characteristics of TV cameras may be improved.

FIG. 2 shows the general characteristic of a chromatic aberration in an optical device. The axis of ordinate in this figure represents a distance "h" between the aberration and the optical axis 0 (an image height) on the focal plane when picked up through a lens, and the axis of abscissa represents the amount of distance, namely the degree of aberration E (h), of the red or blue image from the green image.

Generally, a form of chromatic aberration becomes radial outwardly from the center which is the optical axis, and the degree of aberration is even at a coaxial circle around the optical axis.

This chromatic aberration varies, as indicated by the characteristic curves 9–12 in FIG. 2, in accordance with changes of the aperture stop or iris number, the zoom ratio and the focal length.

If the characteristic of the chromatic aberration curves to the side of (+) in accordance with increase of the distance "h" from the optical axis, as indicated by the characteristic curve 9 in FIG. 2, the registration error thereby caused takes the form of what is called a pincushion, as shown in FIG. 3B. Conversely, if the characteristic curves to the side of (−) as indicated by the characteristic curves 11 and 12 in FIG. 2, the registration error takes the form of a barrel, as shown in FIG. 3C. If the chromatic aberration has a linear characteristic as indicated by the characteristic curve 10 in FIG. 2, the registration error is such as is shown in FIG. 3A in which the angle of field is enlarged (or reduced) at a constant ratio in every respect.

According to one conventional method for correcting chromatic aberration, as shown in FIG. 4, a characteristic curve 13 of a chromatic aberration is approximated by a straight line such as a broken line 14 so as to make a correction waveform corresponding to this straight line, and this correction waveform is added to an electron beam deflection waveform of a deflection circuit, thus correcting the chromatic aberration (this method is disclosed in Japanese Patent Application Kokai No. 49-87237). In this case, the amount of remaining errors is such as indicated by a alternate long and short dash line 15 in FIG. 4.

The above mentioned ensures the correction of high accuracy when the characteristic of the aberration is substantially linear. However, when the curavature is as large as the characteristic curve 13 shown in FIG. 4, a large distortion remains after the correction is carried out, as illustrated by the alternate long and short dash line 15 shown in FIG. 4. This results not only in the correction with inadequate accuracy and a large distortion, but also in a large amount of registration errors at a point having a small distance "h" from the optical axis, namely at the central portion of the image, than the state before the correction is made, as is apparent from comparison between the characteristic curve 13 and the alternate long and short dash line 15 shown in FIG. 4. Generally, the central portion of the image is given the highest resolution through the camera system (lenses, camera tubes) and is important in terms of visual sensation. Accordingly, the elimination of the registration errors is an important problem.

SUMMARY OF THE INVENTION

The object of the present invention is to provide a correcting method and a correction circuit for correcting with higher accuracy the registration errors caused by chromatic aberration in an optical device (zoom lens, dichroic prism).

To this end, the present invention, as shown in FIG. 5, provides the arrangement in which a chromatic aberration of a lens (a solid line 16) is separated into a linear component (a broken line 17) of a magnitude in proportion to the distance (h) from the optical center, namely, the optical axis (0) and into the other non-linear component (a broken line 18), and two individual correction waveforms corresponding to each of these components are generated. The registration errors caused by the chromatic aberration is corrected by these correction waveforms.

According to the present invention, in the multi-tube type TV camera apparatus, the registration errors caused by the chromatic aberration in the optical device can be corrected in a highly accurate manner compared to the conventional method which carries out the approximation by applying a straight line, namely, the method of correcting the linear component alone, so that the overall registration accuracy of the camera is largely improved.

BRIEF DESCRIPTION OF THE DRAWINGS

In the accompanying drawings.

FIGS. 2, 4, 5 and 9A are characteristic diagrams showing chromatic aberrations of lenses;

FIGS. 7 and 10 are block diagrams showing alternative embodiments of the correction circuit according to the present invention;

FIGS. 8A, 8B, 8C and 8D and FIGS. 11A, 11B, 11C and 11D are diagrams schematically showing correction waveforms in the circuits of the embodiments of the present invention.

FIG. 9B is a diagram illustrating a TV screen.

DETAILED DESCRIPTION OF PREFERRED EMBODIMENTS

The preferred embodiments of the present invention is described hereinafter.

Figure 6:
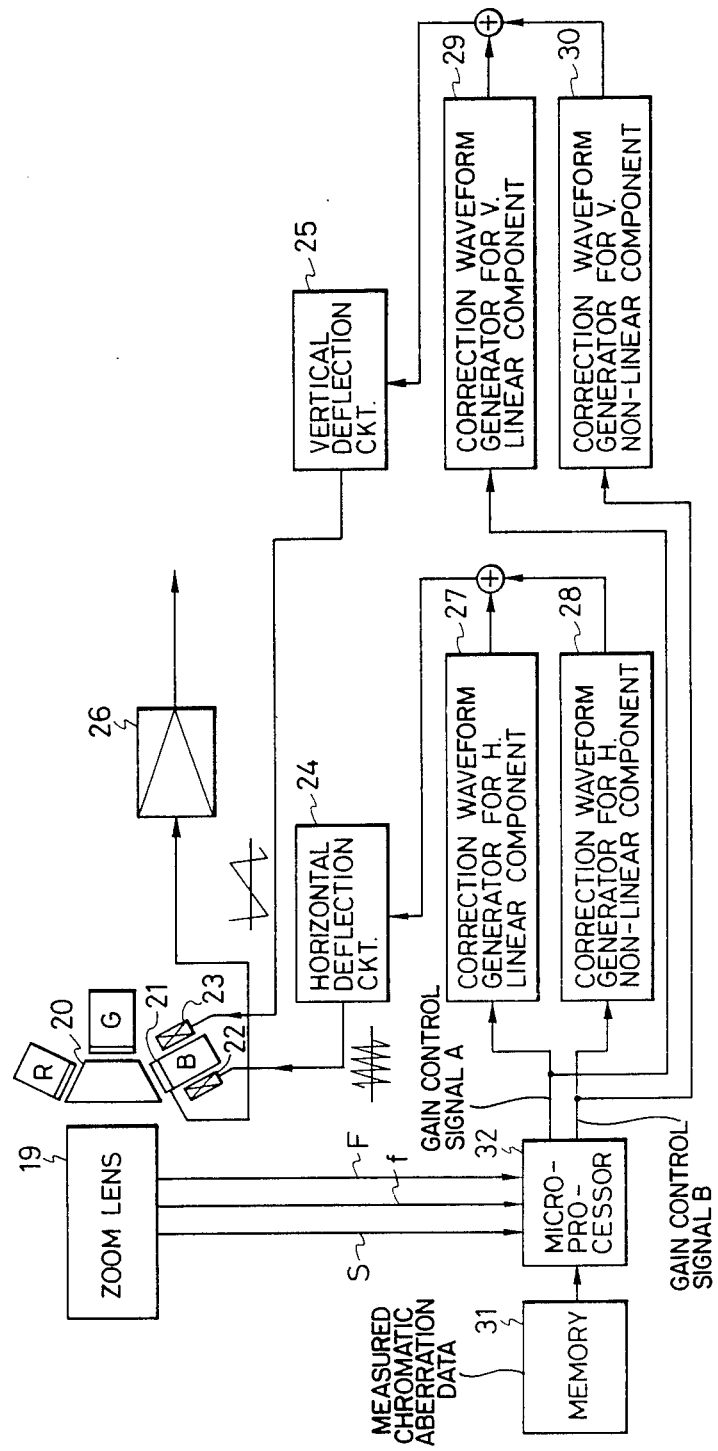
FIG. 6 is a block diagram showing a TV camera to which one embodiment of a registration error correction circuit according to the present invention is applied.

Referring first to FIG. 6, a TV camera to which a correction circuit embodying the present invention is adapted is shown. Numeral 20 denoted a dichroid prism, numeral 21 denotes a camera tube, numeral 22 denotes a horizontal deflection coil, and numeral 23 denotes a vertical deflection coil.

Numerals 27 and 28 respectively denote correction waveform generator circuits corresponding to the horizontal component of the linear and non-linear components of the chromatic aberration occuring through a zoom lens 19. The correction waveform generated through the circuits 27 and 28 is added to the horizontal deflection waveform in the horizontal deflection circuit 24 so as to correct a registration error in the horizontal direction caused by the chromatic aberration of the zoom lens 19.

Numerals 29 and 30 respectively denote correction waveform generator circuits corresponding to the vertical component of the linear and non-linear components of the chromatic aberration occurring through the zoom lens 19. The correction waveform generated through the circuits 29 and 30 is added to the vertical deflection waveform in the vertical deflection circuit 25 so as to correct a registration error in the vertical direction caused by the chromatic aberration of the zoom lens 19.

Figure 1:
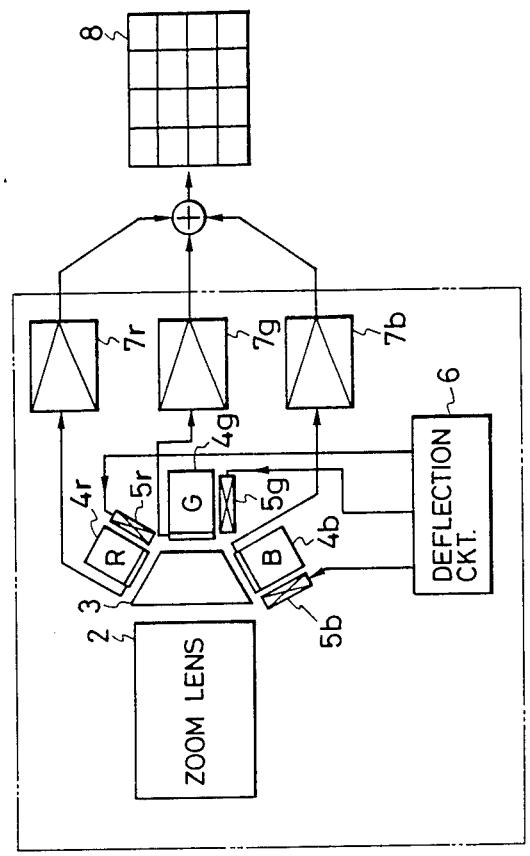
FIG. 1 is a block diagram showing the constitution of a three-tube type color TV camera.
Figure 2:
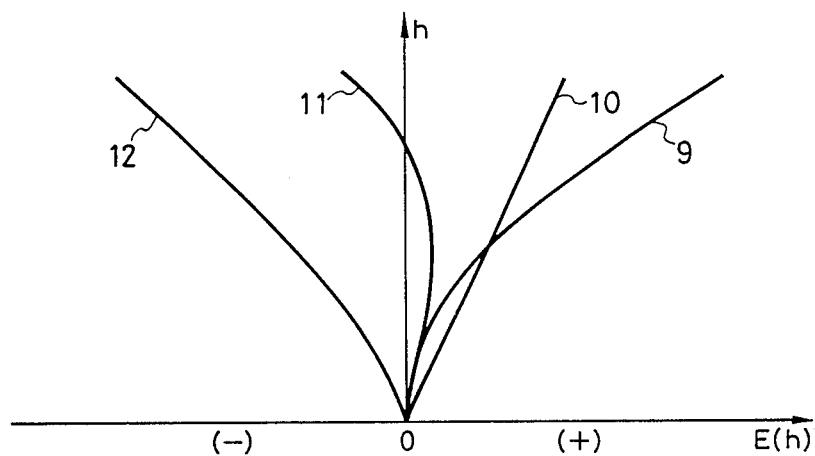
Figure 3A:
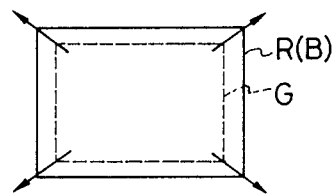
FIGS. 3A, 3B and 3C are diagrams schematically showing the registration errors of an image caused by chromatic aberrations.
Figure 3B:
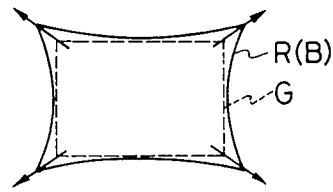
Figure 3C:
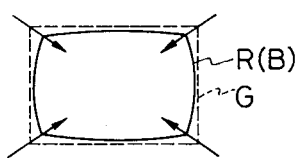
Figure 4:
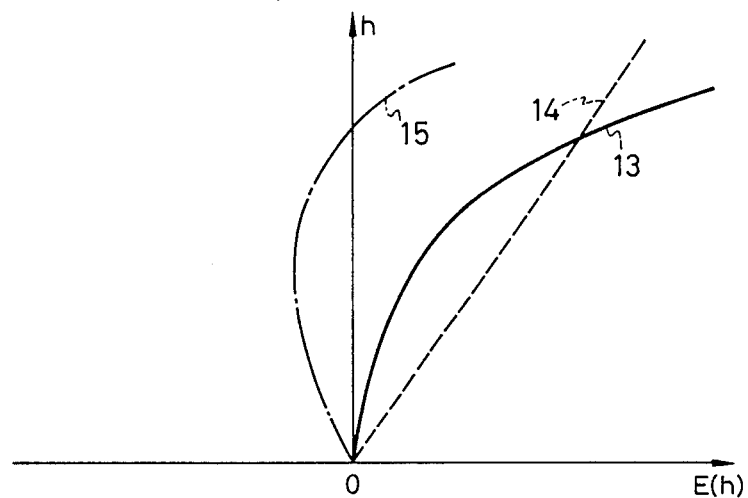

As shown in FIG. 2, the chromatic aberration varies in accordance with respective parameter values of a lens. Accordingly, the circuit shown in FIG. 6 is provided with a microprocessor 32 so as to generated control signals for controlling the level of each correction waveform in the correction waveform generator circuits 27 to 30 in relation to the parameters of the zoom lens 19. That is, in the microprocessor 32, the parameter values for the particular lens utilized such as the value of aperture stop or iris number (F), the zoom ratio (f) and the focal length (S) with respect to the zoom lens 19 and read from the memory 31 where they are previously stored, and the amount of correction required (a desired level of each correction waveform) is calculated from the stored parameter values on measured chromatic aberration of the zoom lens 19. Thus, the control signals are generated based upon this, and the gains of the correction waveform generator circuits 27 to 30 are thereby controlled.

Figure 7:
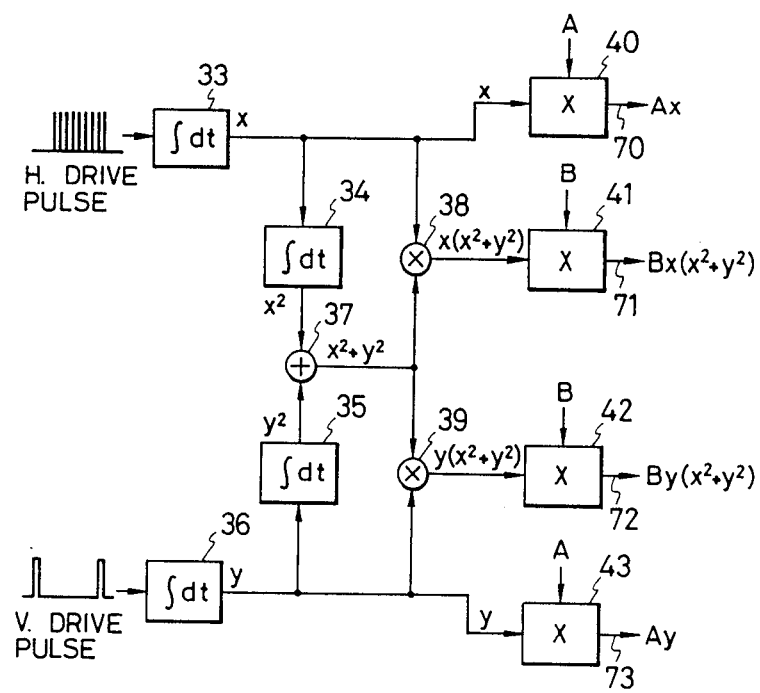

Next, an example of the correction waveform generator circuit is described referring to FIG. 7.

In FIG. 7, integrating circuits are indicated by numerals 33 to 36, an adder circuit by 37, multiplier circuits by 38 and 39 and gain control circuits by 40 to 43. Saw-tooth waveforms having a horizontal scanning period and a vertical scanning period are obtained as outputs of the integrating circuits 33 and 36, respectively. Parabolic waves having a horizontal scanning period and a vertical scanning period are obtained as outputs of the integrating circuits 34 and 35, respectively.

Figure 5:
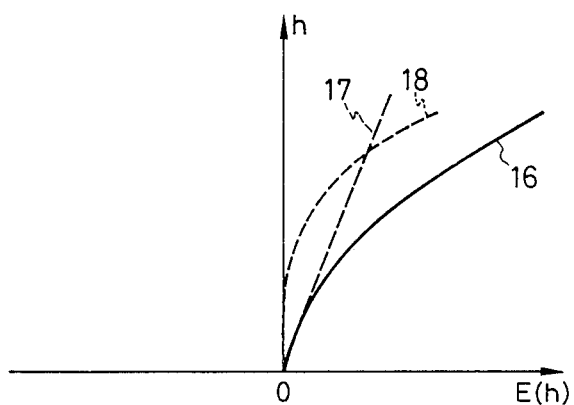

The circuit shown in FIG. 7 is so composed as to generate correction waveforms required in the case in which the linear component 17 of the chromatic aberration 16 shown in FIG. 5 is a tangent line at the optical axis 0 and the non-linear component 18 is approximated by using a cubic curve (because it tends to be accurately approximated by a cubic curve about the distance "h" from the optical axis when occurring through various types of lenses).

The chromatic aberration E (h) relating to the distance between this and the optical axis be, can be represented by the expression, $$E(h) = Ah + Bh^3 \quad (1)$$

Then the horizontal component E (x) and the vertical component E (y) is, $$E(x) = Ax + Bx(x^2 + y^2) \quad (2)$$

$$E(y) = Ay + By(x^2 + y^2) \quad (3)$$

$$(h = \sqrt{x^2 + y^2}\ )$$

Waveforms corresponding to each right side term of these formulas (2) and (3) can be provided by the circuit shown in FIG. 7.

As the chromatic aberration varies in accordance with the parameter values of the lens, coefficients A and B of these formulas (1), (2) and (3) are changed in accordance with the same. These these coefficients A and B are fed as the control signals made by the microprocessor 32 shown in FIG. 6 to the gain control circuits 40 to 43 in the waveform generator circuit shown in FIG. 7.

The outline of each output waveform at the outputs 70 to 73 of the circuit in FIG. 7 is such as illustrated in FIGS. 8A to 8D. H indicates the horizontal scanning period in the TV camera, and V indicates the vertical scanning period of the same.

While, in the example above described, the tangent line at the optical axis is assumed to be the linear component of the chromatic abberation, an alternate long and short dash line 45 as shown in FIG. 9A may be assumed to be the linear component with respect to a chromatic aberration 44. An example of correction waveform in this case is shown as follows.

Let the distance between the optical axis and the point of intersection P of the chromatic aberration 44 and the linear component of the same shown in FIG. 9A as "hp". Then, in accordance with the formula (1), $$E(h) = (A + Bh_p^2)h + B(h^2 - h_p^2)h \quad (4)$$
$$= A'h + B(h^2 - C)h \ (A' = A + Bh_p^2, C = h_p^2)$$

$$E(x) = A'x + B(x^2 + y^2 - C)x \quad (5)$$

$$E(y) = A'y + B(x^2 + y^2 - C)y \quad (6)$$

Waveforms corresponding to each right side terms of these formulas (5) and (6) can be provided by the circuit shown in FIG. 10.

The circuit shown in FIG. 10 is composed by adding a DC level shift circuit 46 for generating the term C in these formulas to the circuit shown in FIG. 7. The advantage of this embodiment which is not attributed to the first embodiment consists of easy adjustment in setting the correction waveform level at the initial step, as it is convenient in this step to utilize the fact that the non-linear component necessarily becomes naught at the point of h=hp, as shown in FIG. 9A.

When hp in FIG. 9B is at the maximum value, namely, the value corresponding to a section on the diagonal line from the optical axis O to the corner M of the screen hp=$h_{max}$), conveniently the non-linear component is naught at the corner point M of the screen. FIGS. 11A to 11D show output waveforms which are observed in this state at the outputs 100 to 103 of the circuit shown in FIG. 10.

In the embodiments above described, the non-linear component is approximated by using a cubic curve, but it is apparent that approximation by curves of other degrees is also possible (n=2, 4 . . . ).

However, when the non-linear component of the chromatic aberration is approximated by the cubic curve relating to the distance from the optical axis, it is possible for the correction waveform generator circuit to be formed by an analogue circuit at a highly small scale, so that the circuit system to which the function of correction is added will not be deteriorated in terms of economy.

We claim:

1. A method for correcting a registration error in a TV camera caused by chromatic aberration of a lens, said TV camera including a plurality of camera tubes for converting an image obtained through said lens into a corresponding plurality of separate signals by scanning a photoelectric conversion target in each of said camera tubes with a respective electron beam, each separate signal representing one of a plurality of different color component of said image, and a deflection circuit for feeding deflection waveforms employed to deflect said electron beams in said camera tubes to respective deflecting devices associated with said camera tubes, said method comprising the steps of:
   generating a correction signal corresponding to a linear component of said registration error and a correction signal corresponding to a non-linear component of said registration error; and
   controlling said deflection circuit on the basis of said correction signals.

2. A method according to claim 1, wherein said correction signal corresponding to the non-linear component is generated in accordance with an approximation value obtained by approximating the non-linear component with a curve of degree n (n being an integer, n≧2) relating the non-linear component to a distance from the optical axis of said lens.

3. A method according to claim 1, wherein said correction signals are generated in accordance with at least one of a plurality of parameters of said lens, said parameters including an aperture stop, a zoom ratio, and the distance between said lens and an object.

4. A correction circuit for correcting a registration error in a TV camera caused by chromatic aberration of a lens, said TV camera including a plurality of camera tubes for converting an image obtained through said lens into a corresponding plurality of separate signals by scanning a photoelectric conversion target in each of said camera tubes with a respective electron beam, each separate signal representing one of a plurality of different color components of said image, and a deflection circuit including horizontal and vertical synchronizing pulse generating means for providing horizontal and vertical synchronizing pulses, said deflection circuit being adapted for generating deflection waveforms employed to deflect said electron beams in said camera tubes and for feeding said deflection waveforms to respective deflecting devices associated with said camera tubes, said correction circuit comprising:
   first integrating means for integrating said horizontal and vertical synchronizing pulses to obtain saw-tooth waveforms of horizontal and vertical scanning periods, respectively;
   second integrating means for integrating said saw-tooth waveforms of said horizontal and vertical scanning periods to obtain parabolic waveforms of said horizontal and vertical scanning periods, respectively;
   adding means for adding said parabolic waveform of said horizontal scanning period to said parabolic waveform of said vertical scanning period;
   first multiplying means for multiplying a waveform obtained from said adding means by said saw-tooth waveform of said horizontal scanning period; and
   second multiplying means for multiplying said waveform obtained from said adding means by said saw-tooth waveform of said vertical scanning period;
   said deflection circuit being controlled on the basis of said saw-tooth waveforms of said horizontal and vertical scanning periods and outputs of said first and second multiplying means.

5. A correction circuit according to claim 4, further comprising a direct current level shift circuit for altering a direct current level of said waveform obtained from said adding means.

6. A correction circuit according to claim 4, wherein the levels of said saw-tooth waveforms of said horizontal and vertical scanning periods and said outputs of said first and second multiplying means are controlled in accordance with at least one of a plurality of parameters of said lens, said parameters including an aperture stop, a zoom ratio, and the distance between said lens and an object.

* * * * *